Jan. 19, 1943. J. L. HILL 2,309,075
METHOD OF OPERATING HIGH PRESSURE OIL AND GAS WELLS
Filed March 9, 1939
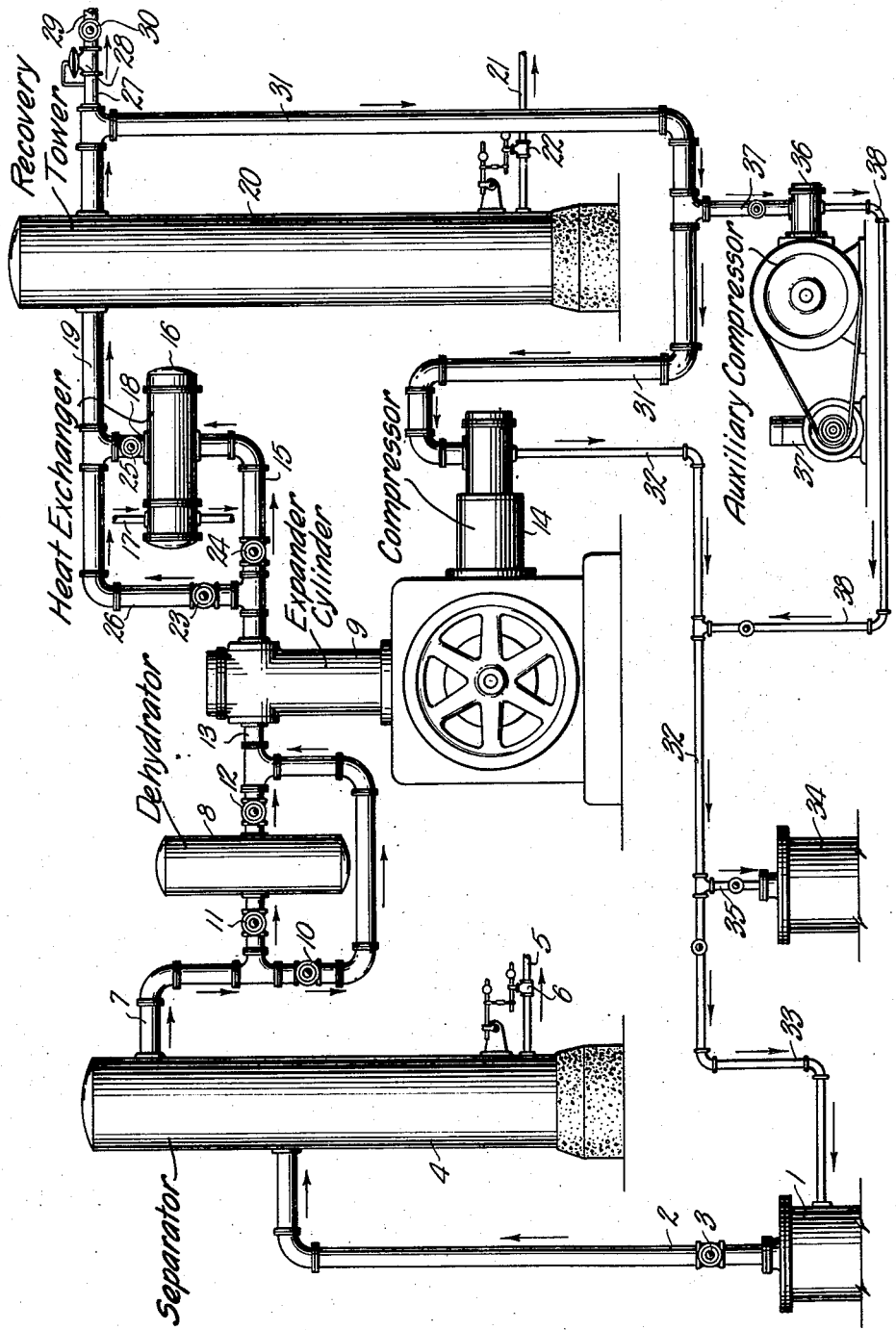
INVENTOR
John L. Hill
BY
ATTORNEY Patented Jan. 19, 1943

2,309,075

UNITED STATES PATENT OFFICE 2,309,075

METHOD OF OPERATING HIGH PRESSURE OIL AND GAS WELLS

John L. Hill, Dallas, Tex., assignor of one-half to Continental Oil Company, Ponca City, Okla., a corporation of Delaware Application March 9, 1939, Serial No. 260,724

7 Claims. (Cl. 166—21)

My invention relates to a method of operating high pressure oil and gas wells, and more particularly to a method of recovering liquid hydrocarbons from high pressure wells.

Frequently high pressure wells are drilled where the gas-oil ratios encountered are high, and in which production is economically prohibitive because of existing State conservation laws. For example, the laws of the State of Texas prohibit the removal of more than 2,000 cubic feet of gas per barrel of oil recovered. In order to operate a well in which the gas-oil ratios are high, it would be necessary to return gas over 2,000 cubic feet per barrel of oil recovered to the well.

This necessitates a large capital expenditure for equipment enabling the return of excess gas to the producing stratum under extremely high pressures. Since it is necessary to reduce the pressure of the gas-oil mixture removed from the well in order to effect an oil recovery, an expenditure in energy to recompress the excess gas to pressures sufficient to enable its return to the producing stratum is required. In a high pressure well, the pressure at which optimum liquid recovery takes place is always considerably below the pressure required to return the gas to the formation from which it was removed. The capital expenditure in the necessary equipment, and the cost of operating the equipment to recompress the gas in order to be able to return it to the desired point in the formation, renders the production of certain high pressure wells, in which high gas-oil ratios exist, commercially impracticable.

In gas-vapor mixtures, the vapor may be removed by compressing the gas and cooling the compressed gas to form a condensate only between atmospheric pressure and pressures between 500 and 700 pounds per square inch. After this critical pressure is reached, further compression will cause the liquid to redissolve in the compressed gas and it cannot be precipitated from the mixture. It appears that the liquid goes into solution with the compressed gas in increasing amounts if the pressure increases above a point usually between 500 and 700 pounds per square inch. This point is the critical point beyond which it becomes progressively more and more difficult to distinguish liquid from gas. The critical phenomenon was discovered by Andrews (Phil. Mag. (4) 39, 150 (1870)).

It will be apparent, therefore, that in dealing with high pressure gas-vapor mixtures, in which the pressure is above the critical pressure, liquid recovery must be effected by a reduction of pressure upon the gas-vapor mixture to within or below the critical pressure range for the temperature. The range at which the liquid constituents precipitate from solution or suspension in the compressed gas is termed the "retrograde condensation" range. This range, of course, varies depending upon the particular composition of the liquid. Recovery is increased with a lowering of the temperature. If the pressure is reduced below the critical pressure range, no additional liquid will condense at a given temperature. Below the retrograde condensation range a further reduction in pressure will result in a redissolution of the vapors in the gas in proportion to their respective vapor pressures and molal concentrations, in accordance with the well known gas laws.

As pointed out above, the critical phenomenon has long been well known to the art. In operating a high pressure well in which the pressures are above the critical range, to recover normally liquid hydrocarbons, it is necessary (a) To reduce the pressure to below the critical pressure;

(b) To cool the gas-vapor mixture to enable the precipitation of liquid hydrocarbons.

In order to comply with the State laws, it is necessary to return all gas in excess of 2,000 cubic feet per barrel of liquid hydrocarbons produced to the formation.

One object of my invention is to provide a method of operating high pressure wells in an economical manner.

Another object of my invention is to provide a method of operating high pressure wells in which the energy available in expanding the high pressure gas-vapor mixture to below the critical pressure is utilized in not only reducing the temperature of the mixture, but also producing work through expansion, which work is employed to recompress previously expanded gas for return to the formation from which it was removed.

Other and further objects of my invention will appear from the following description.

The accompanying drawing, which forms part of the instant specification, and which is to be read in conjunction therewith, is a diagrammatic view of one form of apparatus capable of carrying out the method of my invention.

Referring now to the drawing, a gas-vapor mixture is taken from a well head 1 through pipe 2. It is understood that the well is under a pressure above the critical pressure, which may be anywhere between 1000 pounds per square inch and 2500 pounds per square inch, or higher. The gas passes through pipe 2 into a high pressure separator 4. The valve 3 is normally open so that the full pressure of the well exists upon separator 4.

In most high pressure wells, a choke is provided between the well and the after equipment. In passing through the choke the material taken from the well will be reduced in pressure. This reduction in pressure through the choke expends energy which is not employed in any useful way. In order to make available the full pressure of the well in doing useful work, I permit the full well pressure to exist up to the expander cylinder, as will be hereinafter more fully described.

Liquid components, such as water or foreign matter, and entrained oil still liquid at the formation pressure, are removed from the separator 4 through pipe 5 controlled by a liquid level controlled valve 6. The gas still at the well pressure is withdrawn from the separator 4 through pipe 7.

If the temperature to which the gas will be cooled in the expander cylinder is below that at which gas hydrates will form, the gas is passed through a dehydrator 8 before being permitted to flow into the expander cylinder 9. The dehydrator may be of any suitable type, such as a chamber containing silica gel or any other suitable dehydration material. To pass the gas through the dehydrator 8, valve 10 is closed and valves 11 and 12 are opened. If the chilling which ensues in the expander cylinder 9 is not below the temperature at which gas hydrates will form, the valves 11 and 12 are closed and valve 10 is opened bypassing the dehydrator 8.

The gas passes into the expander cylinder 9, through pipe 13. It will be understood, of course, that the expander cylinder is shown for the purpose of illustration, and not by way of limitation, since any suitable device in which a gas may be expanded to do work, such as a turbine, may be employed. If desired, the expansion may be in a plurality of stages, employing a plurality of cylinders successively larger in size. Similarly, tandem cylinders may be employed if desired. The expander cylinder serves three functions, namely, (a) Acts as a well choke,
(b) Permits the gas to expand to cool the same,
(c) Converts the potential energy of pressure into work by driving a piston or other mechanical device for converting compressed gas into work.

The piston within the expander cylinder will be reciprocated in a manner well known to the art to drive a compressor 14 for recompressing gas previously separated in the process prior to its return to the formation from which it was withdrawn, as will be hereinafter more fully described.

The arrangement is such that the gas is permitted to expand sufficiently to reduce the pressure from the well pressure to below the critical pressure. This critical pressure is normally in the vicinity of 700 pounds per square inch, though it may vary depending upon the particular gas and vapor mixture being processed. In certain cases, the temperature to which the gas-vapor mixture is chilled by expansion alone in the expander cylinder, will not be sufficiently low to permit optimum recovery. In such cases the expanded gas containing droplets of precipitated liquid and vapors are passed through pipe 15, through a heat exchanger 16, to which refrigerating medium is supplied through pipe 17. The chilled expanded mixture leaves the heat exchanger 16 through pipe 18 and passes through pipe 19 into a recovery tower 20, in which the precipitated liquid is separated and withdrawn through pipe 21, controlled by float controlled valve 22. It will be understood that if the expanded gas is to pass through the heat exchanger 16, valve 23 will be closed and valves 24 and 25 will be opened. If the heat exchanger is not required, valves 24 and 25 will be closed, and valve 23 will be opened, permitting the gas to pass through pipe 26 into pipe 19 and hence into the recovery tower 20.

A portion of the gas from the recovery tower not exceeding that permitted by the state laws in which the well is situated, may be withdrawn through pipe 27, controlled by back pressure controlled valve 28, for passage through pipe 29, controlled by shut off valve 30, to the fuel gas mains. The bulk of the gas removed from recovery tower 20 passes through pipe 31 to the compressor 14, in which it is recompressed to slightly above the pressure of the formation to which it is to be returned.

The compressed gas denuded of normally liquid fractions leaves the compressor through pipe 32, and is returned to the formation either through pipe 33 to the well head 1, from which it was withdrawn, or through pipe 35 to the well head 34 of a repressuring well. It is well understood in the art that where a plurality of wells communicate with a single formation, gas may be withdrawn from a number of the wells grouped about a repressuring well to which the recompressed gas is charged for passage to the formation.

In some instances where the gas is lean in normally liquid constituents, it may be necessary to use an auxiliary compressor. In such cases, I provide an auxiliary compressor 36, actuated by a prime mover, such as an internal combustion engine 37. The auxiliary compressor is connected in parallel with the main compressor 14. It takes suction through pipe 37 from the pipe 31. The compressed gas is discharged from the auxiliary compressor 36 through pipe 38 and is passed into the compressed gas pipe 32 along with the bulk of the recompressed gases leaving the compressor 14.

It will be seen that I have accomplished the objects of my invention. I have provided a method of operating a high pressure well in an economical and expeditious manner in order to recover useful liquid hydrocarbons. My method enables wells to be operated which could not otherwise be operated because of the cost of recompressing the expanded gas.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of operating oil and gas wells to recover desirable liquefiable hydrocarbons in a formation in which the pressure is above the critical pressure, including the steps of expanding the hydrocarbons withdrawn from the well from the formation pressure to a pressure below the critical pressure and within the retrograde condensation range, converting pressure energy into kinetic energy during said expanding step, separating precipitated liquid constituents from uncondensed gases in a liquid recovery zone, withdrawing liquids from said recovery zone as the desired liquid hydrocarbons, withdrawing uncondensed gases from said recovery zone, recompressing said uncondensed gases by means of said kinetic energy, and returning the compressed gases to the formation from which they were withdrawn.

2. A method as in claim 1 in which the hydrocarbons withdrawn from the well are subjected to a separation step at the formation pressure before being passed to said expansion step.

3. A method as in claim 1 in which the hydrocarbons withdrawn from the well are subjected to a dehydration step before being passed to said expansion step.

4. A method as in claim 1 in which the hydrocarbons withdrawn from the expansion step are chilled by heat exchange with a cool external medium before being passed to said liquid recovery step.

5. A method as in claim 1 in which a portion of the uncondensed gases withdrawn from the recovery zone are compressed by means of energy obtained from an external source.

6. The method of recovering liquid hydrocarbons from a fluid produced by a well of the distillate type at a high well head pressure which comprises expanding said fluid from a pressure of the order of said well head pressure to a pressure within the retrograde condensation range while said fluid does work, and separating said expanded fluid into a fraction comprising liquid hydrocarbons and a residual gas fraction.

7. The method of recovering liquid hydrocarbons from a fluid produced by a well of the distillate type at a high well head pressure which comprises expanding said fluid from a pressure of the order of said well head pressure to a pressure within the retrograde condensation range while said fluid does work, separating said expanded fluid into a fraction comprising liquid hydrocarbons and a residual gas fraction, utilizing at least a part of the work done by said expanding fluid to compress at least a part of said residual gas fraction, and cycling said recompressed gas to a subsurface formation.

JOHN L. HILL.